(12) United States Patent
Yabuguchi

(10) Patent No.: US 9,205,814 B2
(45) Date of Patent: Dec. 8, 2015

(54) ELECTRIC PARKING BRAKE CONTROL DEVICE

(71) Applicant: Michisada Yabuguchi, Kasugai (JP)

(72) Inventor: Michisada Yabuguchi, Kasugai (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 3 days.

(21) Appl. No.: 14/094,876

(22) Filed: Dec. 3, 2013

(65) Prior Publication Data

US 2014/0156141 A1    Jun. 5, 2014

(30) Foreign Application Priority Data

Dec. 4, 2012 (JP) ................................. 2012-264844

(51) Int. Cl.
| B60T 7/12 | (2006.01) |
| B60T 7/02 | (2006.01) |
| B60T 13/74 | (2006.01) |
| B60T 17/22 | (2006.01) |

(52) U.S. Cl.
CPC ... *B60T 7/02* (2013.01); *B60T 7/12* (2013.01); *B60T 13/74* (2013.01)

(58) Field of Classification Search
CPC ........... B60T 7/12; B60T 8/885; B60T 13/74; B60T 13/665; B60T 13/741; B60T 17/18; B60T 13/58; B60T 13/10; B60T 13/00; B60T 17/22; B61K 7/08; F16D 2121/24; F16D 2066/006; F16D 65/18; F16D 65/38; F16D 65/54
USPC .......................... 303/20, 122, 199; 701/30, 70
See application file for complete search history.

(56) References Cited

U.S. PATENT DOCUMENTS

| 5,957,246 | A | 9/1999 | Suzuki |
| 6,554,108 | B1 | 4/2003 | Bohm |
| 6,969,127 | B2 * | 11/2005 | Suzuki et al. ................... 303/20 |
| 2007/0299566 | A1 | 12/2007 | Goss et al. |
| 2008/0191546 | A1 * | 8/2008 | Plantamura et al. ............ 303/28 |

FOREIGN PATENT DOCUMENTS

| JP | H10-181579 A | 7/1998 |
| JP | 2002-528681 A | 9/2002 |
| JP | 2008-505791 A | 2/2008 |
| JP | 2012-066814 A | 4/2012 |

OTHER PUBLICATIONS

Patent Abstracts of Japan, Japanese Publication No. 2012-066814 dated Apr. 5, 2012 (1 page).

* cited by examiner

*Primary Examiner* — John Q Nguyen
*Assistant Examiner* — Aaron Smith
(74) *Attorney, Agent, or Firm* — Osha Liang LLP

(57) ABSTRACT

An electric parking brake control device has an actuator that drives a motor configured to operate or release an electric parking brake, a control unit that controls the actuator, a storage unit that stores a state of the parking brake, a determining unit that determines the state of the parking brake based on current that flows into the motor, and a detecting unit that detects an ON/OFF state of an ignition switch. When the detecting unit detects that the ignition switch is in the ON state, the actuator sends current in a direction which causes the parking brake to be operated to the motor, and the determining unit determines whether the parking brake is in an operation state or a release state based on the current which flows to the motor.

6 Claims, 9 Drawing Sheets

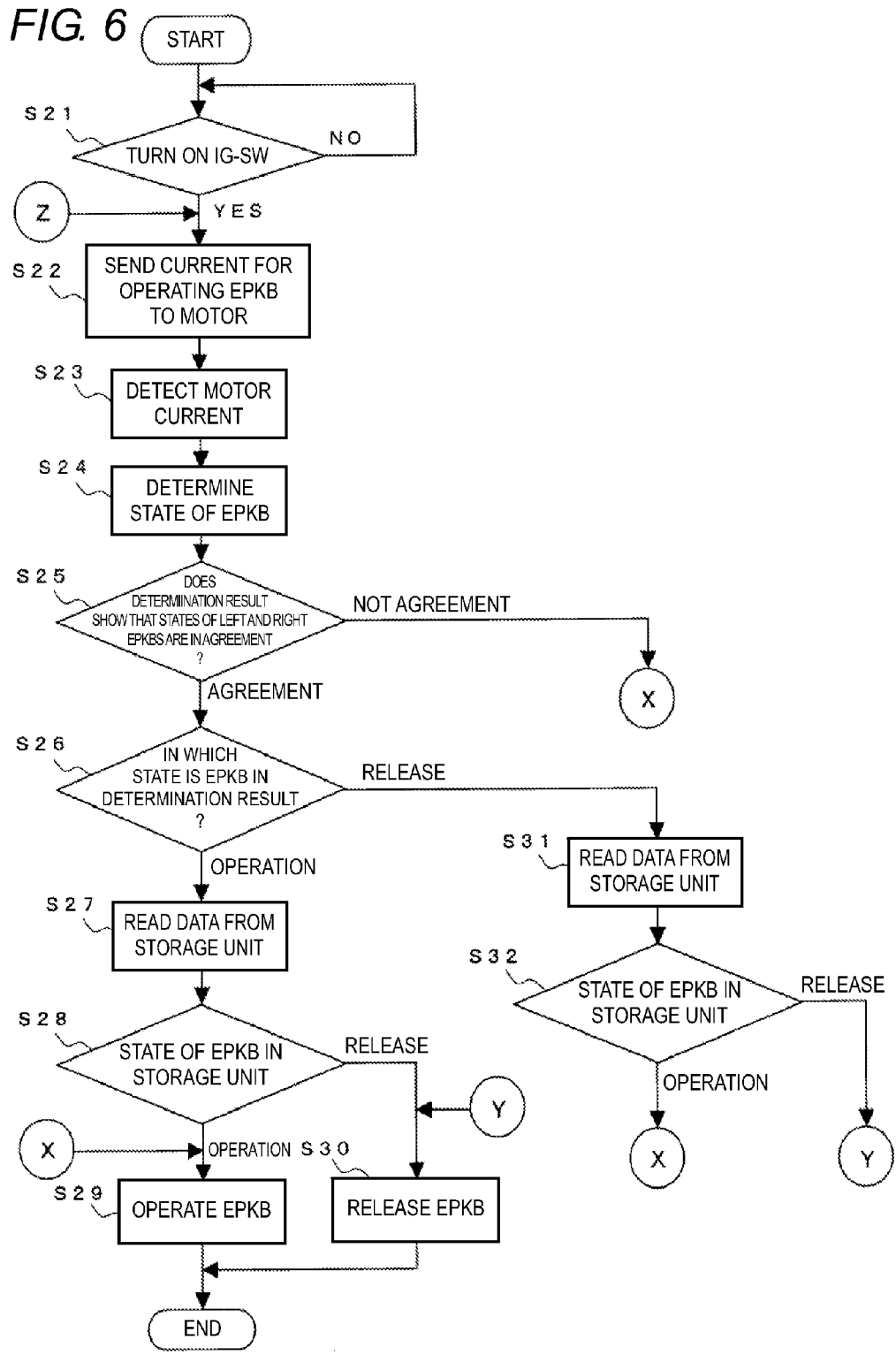

CASE WHERE EPKB HAS BEEN IN RELEASED STATE
EVEN BEFORE IG-SW IS TURNED ON

CASE WHERE EPKB HAS BEEN IN OPERATED STATE
EVEN BEFORE IG-SW IS TURNED ON

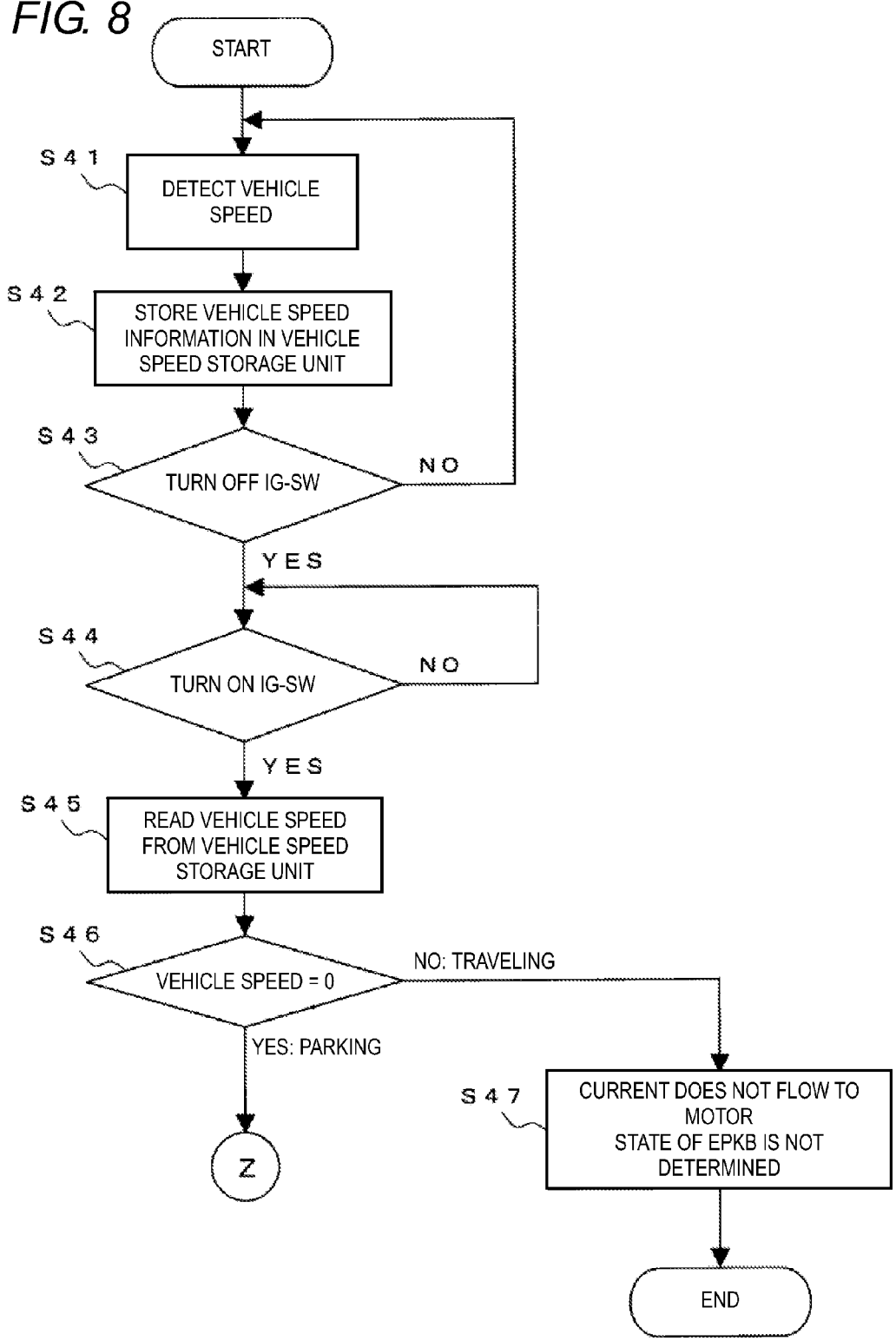

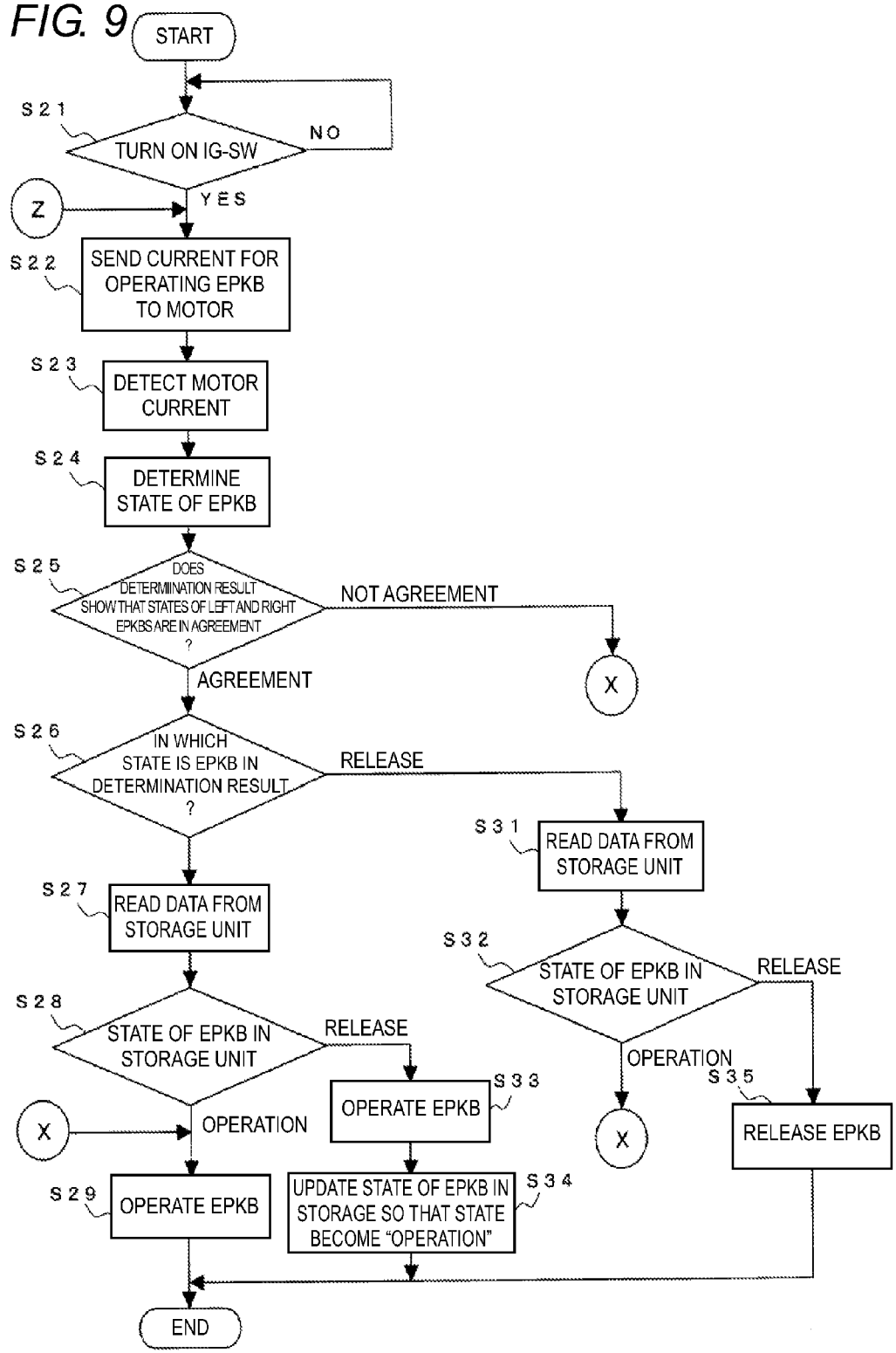

ELECTRIC PARKING BRAKE CONTROL DEVICE

BACKGROUND OF THE INVENTION

1. Technical Field

The present invention relates to an electric parking brake control device which controls an electric parking brake of a vehicle.

2. Related Art

In cars, electric parking brakes tend to replace manual-type parking brakes.

In an electric parking brake, a button is manipulated to drive an actuator such as a motor, thereby operating or releasing a parking brake. Furthermore, for example, the parking brake can be automatically operated at the time of parking, or can also be automatically released at the time of a hill start. To this end, a state ("operation" or "release") of the parking brake needs to be stored by an ECU (Electric Control Unit) or the like.

Japanese Patent Publication Laid-open Nos. 2012-66814 and 10-181579 and National Patent Publication Nos. 2008-505791 and 2002-528681 disclose devices or methods for controlling a parking brake.

According to Japanese Patent Publication Laid-open No. 2012-66814, a memory element indicating whether a parking brake is in a change-over state to operation or to release is created after manipulation of a button. When the memory element is set after failure of a control device, the parking brake is moved to a release side by a motor, and recalibration is performed. At this time, a collision of the parking brake with a stopper is detected based on consumption current of the motor, and the parking brake is moved by a predetermined amount from this position.

According to Japanese Patent Publication Laid-open No. 10-181579, when an ignition switch is in an ON state, an actuator, such as a motor, operates and generates slight breaking torque to a parking brake. A position of a piston at this time is set as an initial position. A position at which the piston is moved back from the initial position by a predetermined amount is set as a starting point. After the parking brake is operated according to instructions, the piston is moved back to the starting point and a predetermined pad clearance is obtained.

According to National Patent Publication No. 2008-505791, a sensor detects force applied to a force transmission device or a braking device and a position of an actuator such as a motor provided in the force transmission device when the parking brake is operated or released. The drive of the actuator is controlled based on a detection value and a preset value.

According to National Patent Publication No. 2002-528681, a reference position, reference coordinates, actual coordinates of the actuator are determined by a micro-switch, a Hall sensor, or a resolver, or based on motor current, at the time of operation or release of the parking brake. In addition, a motion range is determined from release end coordinates and manipulation end coordinates of the actuator. When the actual coordinates are out of the motion range, a signal is outputted.

For example, for maintenance of the electric parking brake, there is a case where a control system (ECU etc.) for the parking brake still remains mounted in a vehicle body, and a mechanical system (a brake unit, a motor, etc.) is removed from the vehicle body and then repaired or replaced. In this case, in terms of the control system, the brake state, "operation" or "release", is stored in the ECU before the removal of the brake. On the other hand, in terms of the mechanical system, since the motor or the like is likely to be driven at the time of repair or replacement, the brake may be switched to a position different from the position in which the brake is situated before the removal of the brake, and thus the brake state may be changed. Therefore, even though the brake state, "operation" or "release", remains stored in the control system, the mechanical system is not necessarily in the same brake state as stored after the brake is remounted in the vehicle body. When the mechanical system is situated in a state different from the brake state stored in the control system after it is remounted to the vehicle body, there is a possibility that the parking brake does not normally function, etc.

SUMMARY

One or more embodiments of the invention provides an electric parking brake control device which makes at least one electric parking brake not operate until a brake state of a mechanical system and a brake state of a control system agree with each other.

In accordance with one or more embodiments of the invention, an electric parking brake control device includes at least one actuator which drives at least one motor configured to operate or release at least one electric parking brake, a control unit which controls the at least one actuator, a storage unit which stores a state of the at least one parking brake, at least one determining unit which determines a state of the at least one parking brake based on current which flows into the at least one motor, and a detecting unit which detects an ON/OFF state of an ignition switch. The at least one actuator may send current flowing in a direction which causes the at least one parking brake to be operated to the at least one motor when the detecting unit detects that the ignition switch is in the ON state. The at least one determining unit may determine whether the at least one parking brake is in an operation state or a release state based on the current flowing into the at least one motor. When the control unit compares a state of the at least one parking brake determined by the at least one determining unit with a state of the at least one parking brake stored in the storage unit and the state of the at least one parking brake determined by the at least one determining unit and the state of the at least one parking brake stored in the storage unit are in agreement with each other, the control unit controls the at least one actuator such that the at least one parking brake maintains the states which are in agreement with each other.

According to the above description, whether the at least one parking brake is in the operation state or the release state may be determined based on the current for the at least one motor which flows in the direction which causes the at least one electric parking brake to be operated. Furthermore, when it is determined that the brake state (brake state of a mechanical system) determined and the brake state (brake state of a control system) stored in the storage unit are in agreement, the at least one parking brake may be controlled such that the brake state determined and the brake state stored are consistently in agreement. Accordingly, the at least one parking brake can be operated in a state where the brake state of the mechanical system and the brake state of the control system are in agreement.

In addition, in the electric parking brake control device according to one or more embodiments the present invention, the control unit may update the state of the at least one parking brake stored in the storage unit whenever the control unit controls the at least one actuator such that the at least one parking brake is operated or released.

In addition, in the electric parking brake control device according to one or more embodiments of the present invention, when the state of the at least one parking brake determined by the at least one determining unit and the state of the at least one parking brake stored in the storage unit are not in agreement, the control unit may control the at least one actuator such that the at least one parking brake enters the state which is stored in the storage unit.

In addition, in the electric parking brake control device according to one or more embodiments of the present invention, when the state of the at least one parking brake determined by the at least one determining unit and the state of the at least one parking brake stored in the storage unit are not in agreement, the control unit may control the at least one actuator such that the at least one parking brake enters the operation state.

In addition, in the electric parking brake control device according to one or more embodiments of the present invention, the at least one parking brake may include parking brakes for left and right sides, the at least one motor may include motors for the left and right sides, the at least one actuator may include actuators for the left and right sides, the at least one determining unit may determine whether the parking brakes for the left and right sides are in the operation state or the release state, the control unit may control the actuators such that the parking brakes enter the operation state when it is determined, by the at least one determining unit, that states of the parking brakes for the left and right sides differ from each other.

Yet in addition, in the electric parking brake control device according to one or more embodiments of the present invention, the control unit may determine whether a vehicle is traveling or not, based on vehicle speed information which is externally inputted. Thus, when it is determined that the vehicle is traveling, the current is not sent to the at least one motor by the at least one actuator so that the at least one determining unit may not determine the state of the at least one parking brake even though the detecting unit detects the ignition switch being in the ON state.

According to one or more embodiments of the present invention, an electric parking brake can be operated in a state where a brake state of a mechanical system and a brake state of a control system are in agreement.

BRIEF DESCRIPTION OF THE DRAWINGS

FIG. 6 is a flowchart illustrating operation of the EPKB control device during an ON state of an IG-SW of FIG. 1;

FIG. 8 is a flowchart illustrating operation of the EPKB control device of FIG. 1 during traveling of a vehicle; and FIG. 9 is a flowchart illustrating operation of an EPKB control device according to one or more embodiments of the present invention during an ON state of an IG-SW.

DETAILED DESCRIPTION

Hereinafter, embodiments of the present invention will be described with reference to the drawings. Identical or equivalent portions through all the drawings are represented by the same reference signs. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
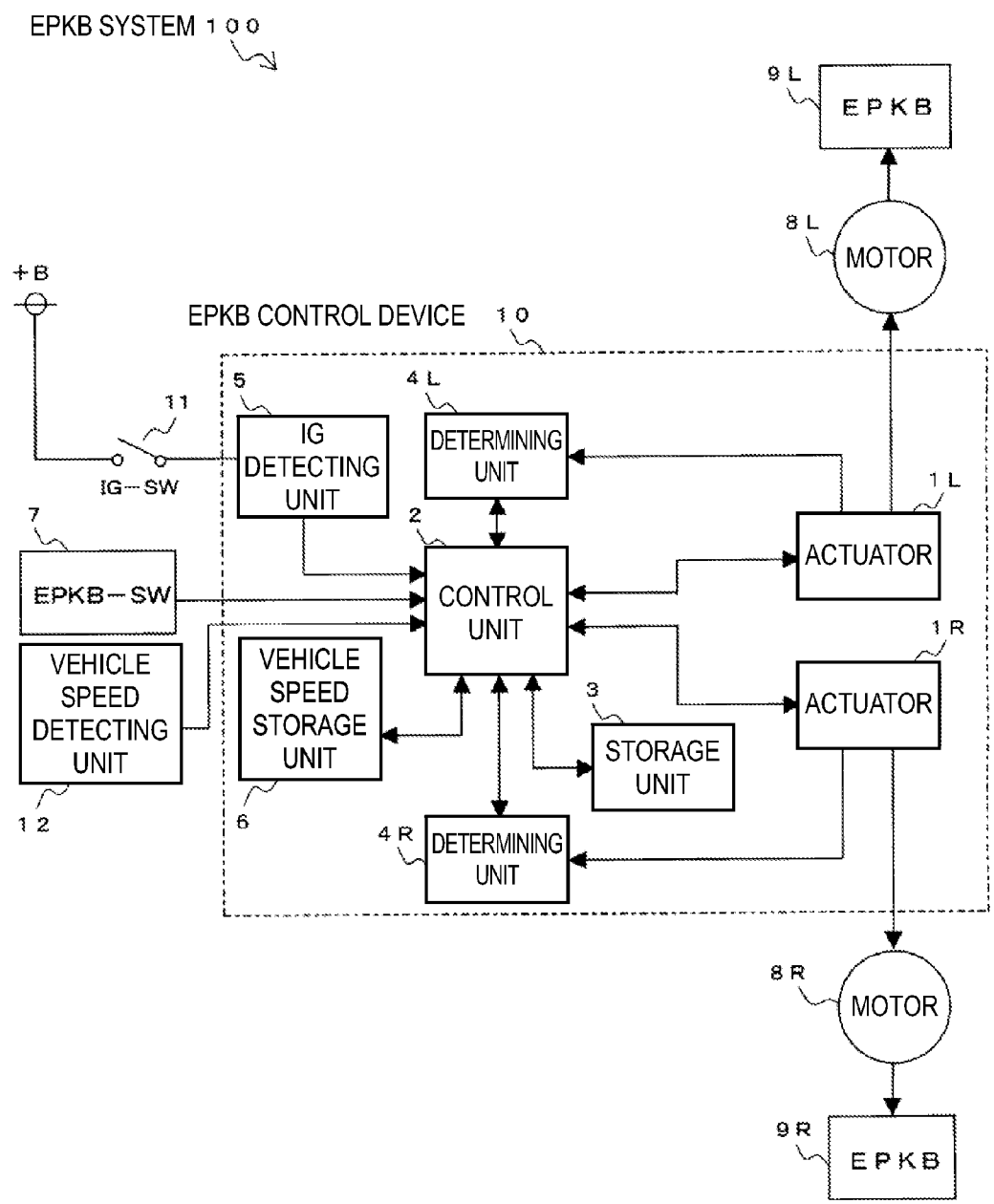
FIG. 1 is a block diagram of an EPKB (Electric Parking Brake) control device according to one or more embodiments of the present invention.

First, the construction of an electric parking brake system 100 according to one or more embodiments of the present invention is described with reference to FIG. 1. Hereinbelow, "electric parking brake" is referred to as "EPKB."

The EPKB system 100 is mounted in a car. An EPKB control device 10 constitutes a control system of the EPKB system 100. An EPKB switch (hereinafter, referred to as EPKB-SW) 7 constitutes an operation system of the EPKB system 100. Motors 8L and 8R and EPKBs 9L and 9R constitute a mechanical system of the EPKB system 100.

The EPKB-SW 7 includes a tumbling-type switch, for example, and is disposed in the driver's seat of a car. The EPKB-SW 7 can be switched among three states: neutral, operation, and release.

The motors 8L and 8R include direct current motors, each including a brush and a commutator. The motors 8L and 8R rotate normally or are reversed according to the direction of current which flows across the motors.

The motor 8L and the EPKB 9L are provided, for example, in a front left wheel of the car. The EPKB 9L is operated or released by the driving force originating in the normal rotation or the reversed rotation of the motor 8L. The motor 8R and the EPKB 9R are provided, for example, in a front right wheel of the car. The EPKB 9R is operated or released by the driving force originating in the normal rotation or the reversed rotation of the motor 8R.

Rotation of the front left and front right wheels is stopped by operating the EPKBs 9L and 9R. Rotation of the front left and front right wheels are enabled by releasing the EPKBs 9L and 9R.

The EPKB control device 10 is equipped with actuators 1L and 1R, a control unit 2, a storage unit 3, determining units 4L and 4R, an IG detecting unit 5, and a vehicle speed storage unit 6.

The actuator 1L sends current to the motor 8L on the left side in order to rotate the motor 8L normally or reversely, thereby operating or releasing the EPKB 9L in the left side. The actuator 1R sends current to the motor 8R on the right side in order to rotate the motor 8R normally or reversely, thereby operating or releasing the EPKB 9R in the right side. The control unit 2 controls operation of the actuators 1L and 1R.

The storage unit 3 stores the states ("operation" or "release") of the EPKBs 9L and 9R. The control unit 2 updates the states of the EPKBs 9L and 9R stored in the storage unit 3 whenever the control unit 2 controls the actuators 1L and 1R such that the EPKBs 9L and 9R are operated or released.

The determining unit 4L determines the state of the EPKB 9L on the left side based on the current which flows to the motor 8L on the left side. The determining unit 4R determines the state of the EPKB 9R on the right side based on the current which flows to the motor 8R on the right side.

The IG detecting unit 5 detects an ON state of the IG-SW 11 when the IG-SW (ignition switch) 11 is manipulated to an ON position and is supplied with power from a power supply+B. On the other hand, the IG detecting unit 5 detects an OFF state of the IG-SW 11 when the IG-SW 11 is manipulated to an OFF position and power supply from the power supply+B to the IG-SW 11 is interrupted. The IG detecting unit 5 is an example of the "detecting unit" according to one or more embodiments of the present invention.

The vehicle speed storage unit 6 frequently stores vehicle speed information detected by a vehicle speed detecting unit 12. The control unit 2 determines whether a car is traveling or not based on the vehicle speed information stored in the vehicle speed storage unit 6.

Figure 2:
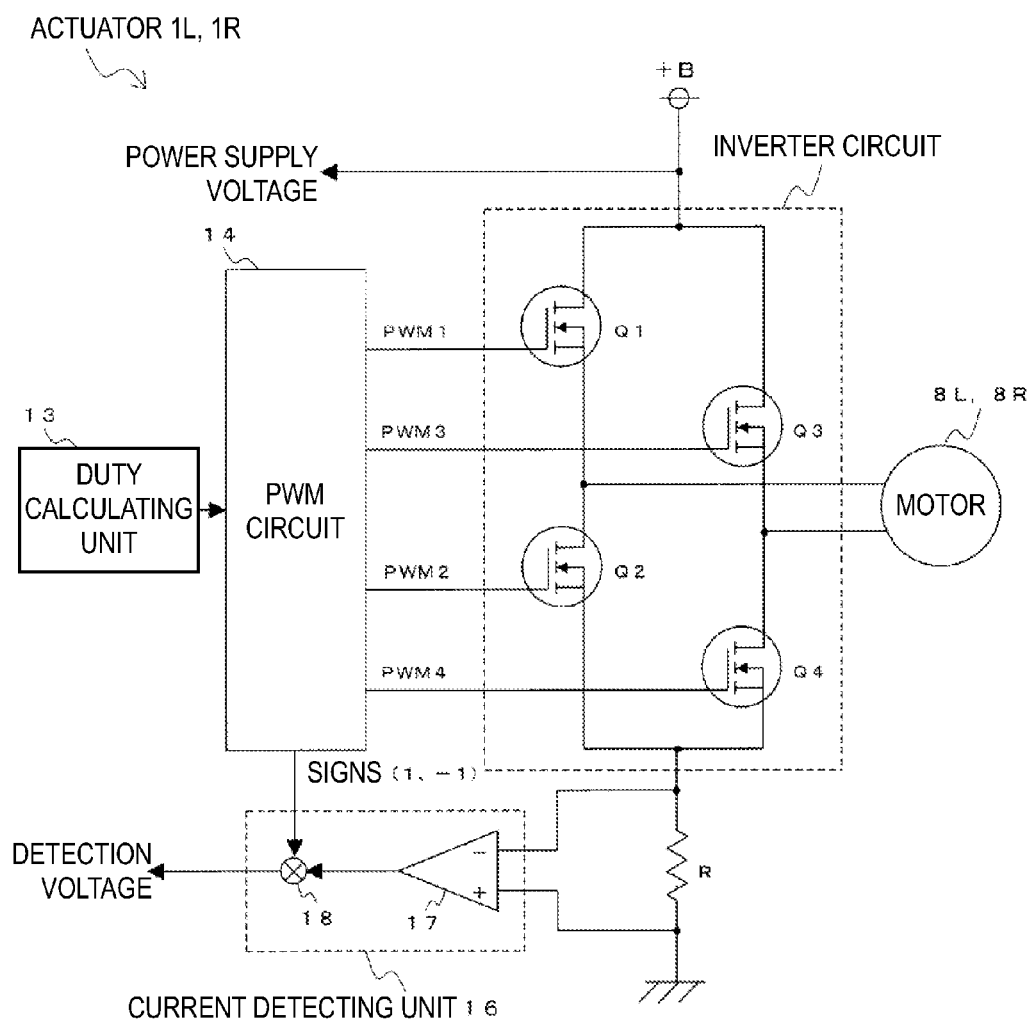
FIG. 2 is a diagram illustrating a detailed construction of an actuator of FIG. 1.

Next, a specific construction of the actuators 1L and 1R is described with reference to FIG. 2. Suitably, FIG. 3 is also referred to.

Each of the actuators 1L and 1R is equipped with a duty calculating unit 13, a PWM circuit 14, an inverter circuit 15, and a current detecting unit 16.

The duty calculating unit 13 performs a predetermined operation based on a command value (voltage) from the control unit 2, and a voltage value of the power supply+B, and computes a duty of a PWM (Pulse Width Modulation) signal for driving the motors 8L and 8R.

The PWM circuit 14 generates the PWM signal depending on the duty computed by the duty calculating unit 13, and outputs the PWM signal to the inverter circuit 15. The PWM circuit 14 outputs information indicating normal or reversed operation of the motors 8L and 8R to the current detecting unit 16 as a plus or minus sign.

The inverter circuit 15 includes an H bridged circuit to which four switching elements Q1, Q2, Q3, and Q4 are bridge-connected. Each of the switching elements Q1, Q2, Q3, and Q4 includes a MOSFET, for example.

The PWM signals (PWM1, PWM2, PWM3, PWM4) from the PWM circuit 14 are inputted to gates of the switching elements Q1, Q2, Q3, and Q4, respectively. The switching elements Q1, Q2, Q3, and Q4 perform ON/OFF switching operations according to the PWM signals, and allow current from the power supply+B to flow into the motors 8L and 8R.

The current detecting unit 16 has an operational amplifier 17 and a multiplier 18. The operational amplifier 17 takes in a voltage between both ends of a current detection resistor R according to a motor current which flows across the current detection resistor R, and converts the voltage into a current value by multiplying the voltage by a predetermined gain.

The multiplier 18 multiplies the output of the operational amplifier 17 by the sign, 1 or −1, given from the PWM circuit 14, and outputs a detected current value with the plus sign or minus sign.

Figure 3A:
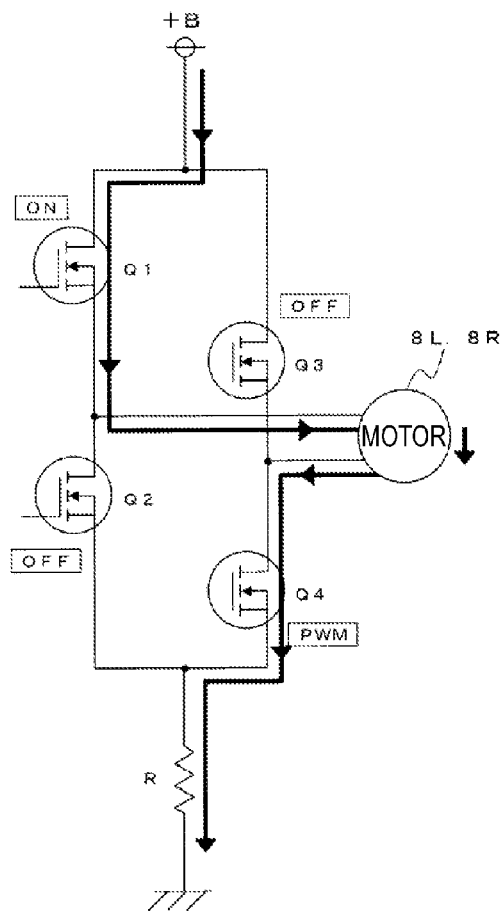
FIGS. 3A and 3B are diagrams illustrating a current path in an inverter circuit of FIG. 2.

The above-mentioned signs are decided according to the direction of the current which flows into the motors 8L and 8R. As illustrated in FIG. 3A, among the switching elements, when the switching elements Q2 and Q3 are in an OFF state while the switching element Q1 is in an ON state, and the switching element Q4 performs a switching operation according to the PWM signal, the current flows to the motors 8L and 8R along a current path indicated by an arrow and the motors 8L and 8R normally rotate. In this case, the sign "1" is outputted to the current detecting unit 16 from the PWM circuit 14, and the EPKBs 9L and 9R are operated.

Figure 3B:
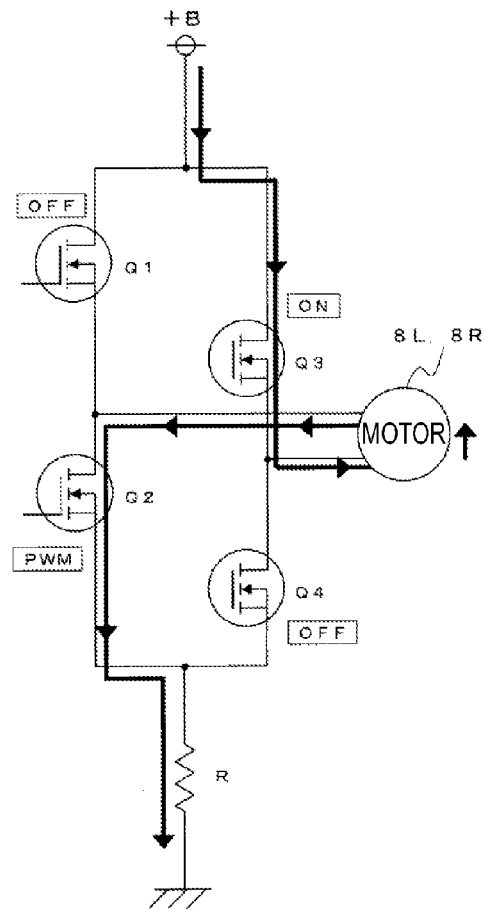

On the other hand, as illustrated in FIG. 3B, among the switching elements, when the switching Q3 is in the ON state, the switching elements Q1 and Q4 are in the OFF state, and the switching element Q2 performs a switching operation according to the PWM signal, the current flows to the motors 8L and 8R along a current path indicated by an arrow and the motors 8L and 8R are reversed in rotation. In this case, the sign "−1" is outputted to the current detecting unit 16 from the PWM circuit 14, and the EPKBs 9L and 9R are released.

A ripple occurs in the motor current outputted from the current detecting unit 16 whenever the commutator, which comes into slide contact with the brush, changes over during the drive of the motors 8L and 8R. For this reason, the control unit 2 processes the motor current with a low pass filter (not illustrated), and detects the current value from which the ripple is removed.

The control unit 2 processes the motor current with a band pass filter (not illustrated) in order to extract the ripple, and generates a pulse using a pulse forming circuit (not illustrated). Next, the control unit 2 computes the rotation speeds and rotary positions of the motors 8L and 8R based on this pulse.

Next, the control unit 2 performs predetermined processing based on the rotary positions, rotation speeds, and current values of the motors 8L and 8R, and determines a command value to be outputted to the duty calculating unit 13 for the actuators 1L and 1R. Thus, the motors 8L and 8R are controlled based on feedback using the control unit 2 and the actuators 1L and 1R.

Next, operation of the EPKB control device 10 when the EPKB-SW 7 is manipulated is described with reference to FIGS. 4 and 5.

Figure 4:
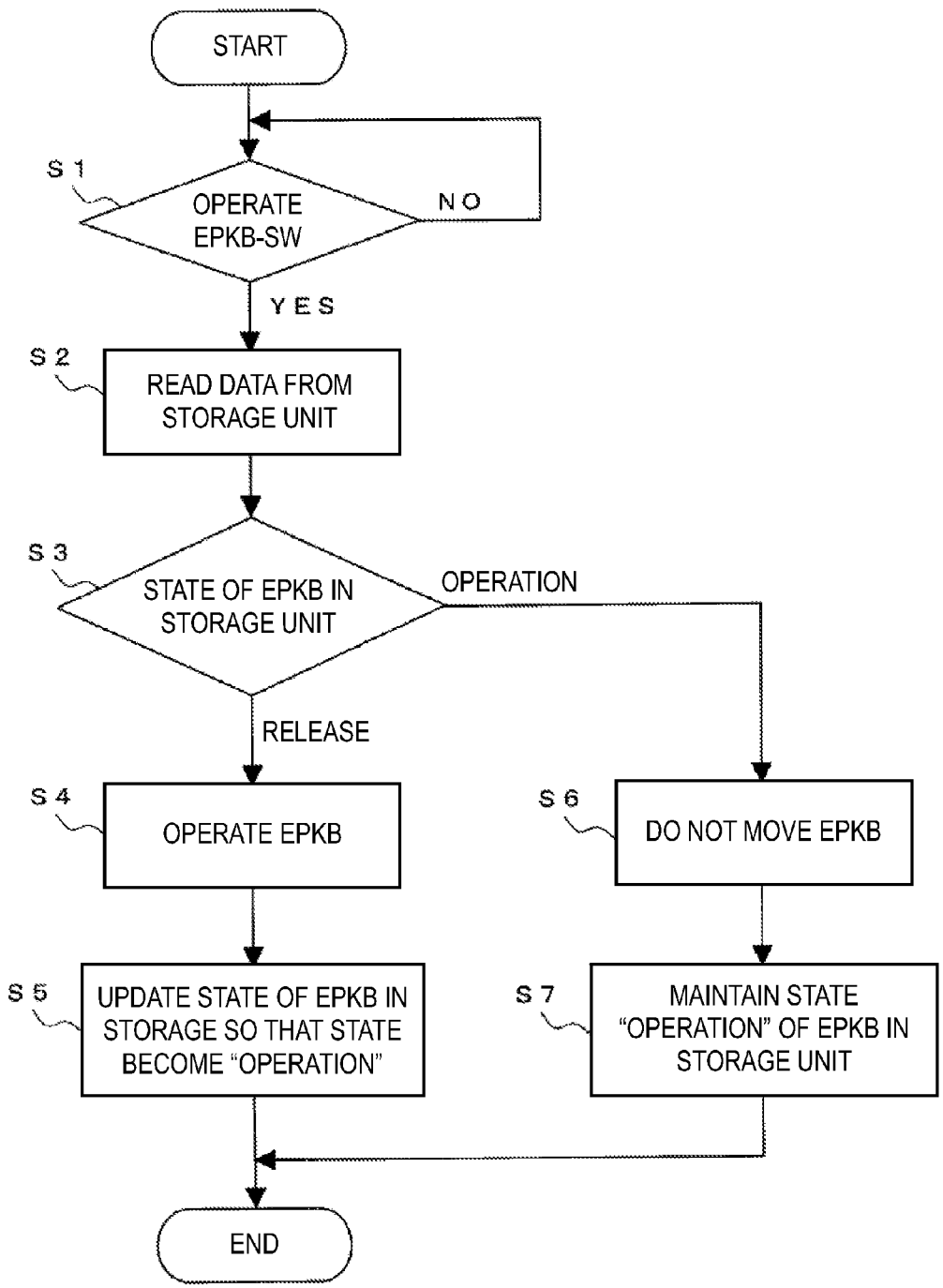
FIG. 4 is a flowchart illustrating operation of the EPKB control device at the time of manipulation such that an EPKB-SW of FIG. 1 is operated.

FIG. 4 is a flowchart at the time of manipulation of switching to an operation state. If a driver of a car manipulates the EPKB-SW 7 so that the EPKB-SW 7 is operated (YES in Step S1 of FIG. 4), the control unit 2 reads the states of the EPKBs 9L and 9R from the storage unit 3 (Step S2). At this time, if the states of the EPKBs 9L and 9R stored in the storage unit 3 are "release" (release in Step S3), the control unit 2 controls the actuators 1L and 1R to operate the EPKBs 9L and 9R (Step S4). Next, the control unit 2 updates the states of the EPKBs 9L and 9R stored in the storage unit 3 so that the states of the EPKBs 9R and 9R become "operation" (Step S5).

On the other hand, if the states of the EPKBs 9L and 9R stored in the storage unit 3 are not "release" but "operation" (operation in Step S3), the control unit 2 does not drive the EPKBs 9L and 9R through the actuators 1L and 1R (Step S6). Next, the state "operation" of the EPKBs 9L and 9R stored in the storage unit 3 is maintained (Step S7).

Figure 5:
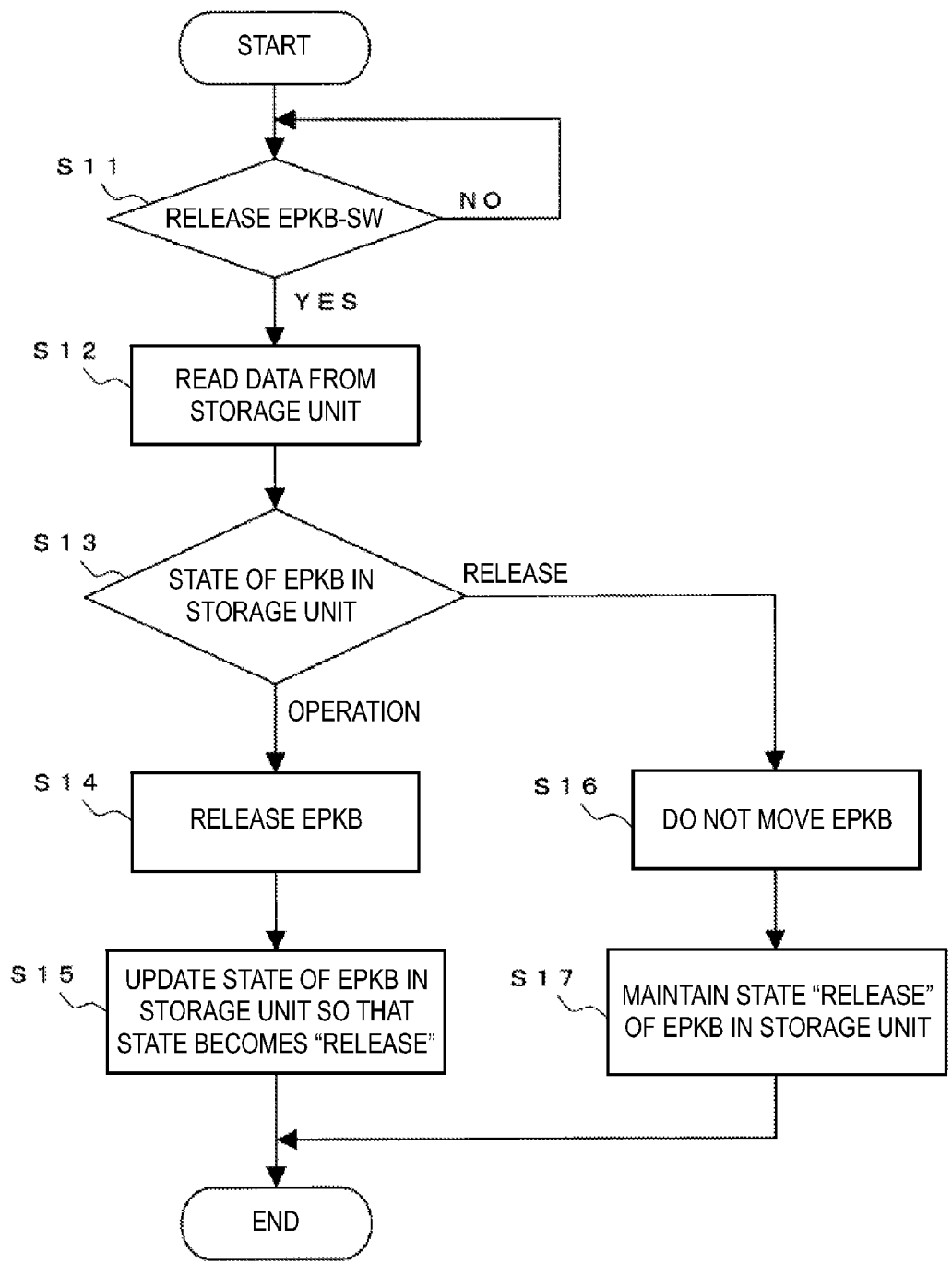
FIG. 5 is a flowchart illustrating operation of the EPKB control device at the time of manipulation such that the EPKB-SW of FIG. 1 is released.

FIG. 5 is a flowchart at the time of manipulation of switching to a released. If the driver performs the release manipulation of the EPKB-SW 7 (YES in Step S11 of FIG. 5), the control unit 2 reads the states of the EPKBs 9L and 9R from the storage unit 3 (Step S12). At this time, if the states of the EPKBs 9L and 9R stored in the storage unit 3 are "operation" (operation in Step S13), the control unit 2 controls the actuators 1L and 1R to release the EPKBs 9L and 9R (Step S14). Next, the control unit 2 updates the states of the EPKBs 9L and 9R stored in the storage unit 3 so that the states of the EPKBs 9R and 9R become "release" (Step S15).

On the other hand, if the states of the EPKBs 9L and 9R stored in the storage unit 3 are not "operation" but "release" (release in Step S13), the control unit 2 does not drive the EPKBs 9L and 9R through the actuators 1L and 1R (Step S16). Next, the state "release" of the EPKBs 9L and 9R stored in the storage unit 3 is maintained (Step S17).

Next, operation of the EPKB control device 10 at the time of turning on the IG-SW 11 is described with reference to FIG. 6. Suitably, FIGS. 3 and 7 are also referred to.

If the IG detecting unit 5 detects that the IG-SW 11 switches from an OFF state to an ON state (YES in Step S21 of FIG. 6), the actuators 1L and 1R send current for operating the EPKBs 9L and 9R to the motors 8L and 8R (Step S22). Through this operation, the current flows to the motors 8L and 8R along the current path indicated by the arrow of FIG. 3A, and thus the motors 8L and 8R normally rotate.

Next, the current detecting unit 16 (FIG. 2) for the actuators 1L and 1R detects the current flowing into the motors 8L and 8R (Step S23), and the determining units 4L and 4R determine the states of the EPKBs 9L and 9R based on the detected current value (Step S24).

Figure 7A:
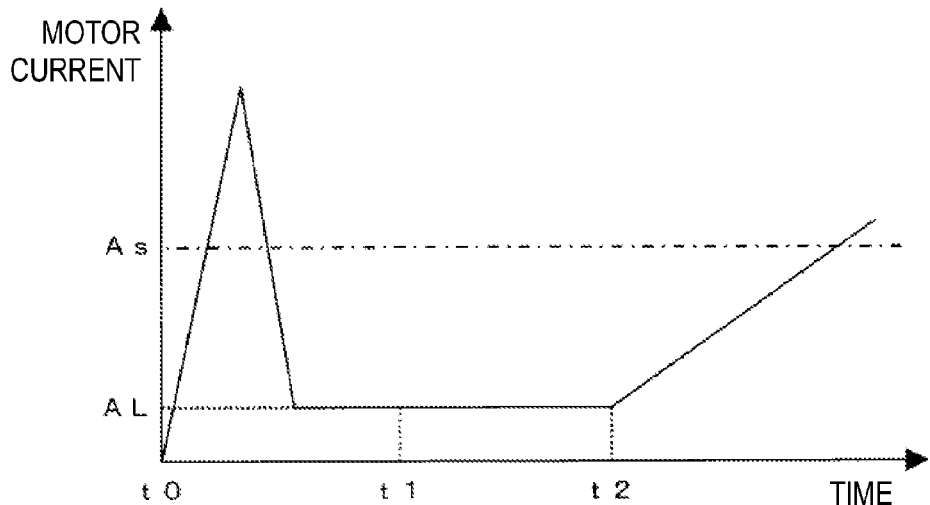
FIGS. 7A and 7B are diagrams illustrating changes in current flowing into a motor during the ON state of the IG-SW of FIG. 1.

In the case where the EPKBs 9L and 9R have been in the release state since a certain time point before the IG-SW 11 enters the ON state, the detected current value of the motors 8L and 8R changes as illustrated in FIG. 7A. In detail, if the current begins flowing into the motors 8L and 8R (at time t0), the detected current value temporarily rises due to the inflow current. Next, as the motors 8L and 8R consume power, the detected current value changes to a low level AL. After that, if the EPKBs 9L and the 9R are operated by the driving force of the motors 8L and 8R and a brake pad and a disk come into contact with each other (at time t2), the detected current value rises.

Figure 7B:
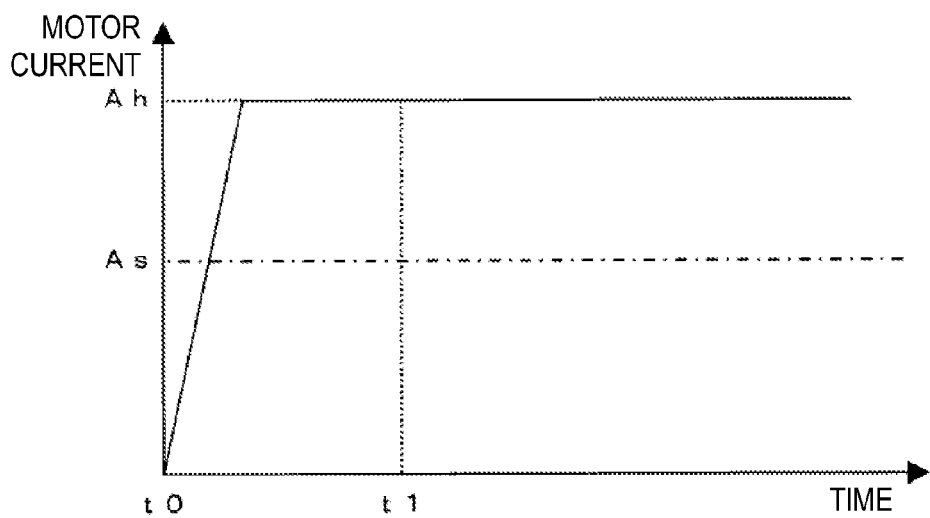

On the other hand, in the case where the EPKBs 9L and 9R have been in the operation state since a certain time point before the IG-SW 11 enters the ON state, the detected current value of the motors 8L and 8R changes as illustrated in FIG. 7B. In detail, if the current begins flowing into the motors 8L and 8R (at time t0), the detected current value abruptly rises. Since the brake pad and the disk are already in contact with each other, the detected current value changes to a high level Ah.

Further, in the case where the states of the left and right EPKBs 9L and 9R differ since a certain time point before the IG-SW 11 enters the ON state, the detected current value of either one of the motors 8L and 9R changes as illustrated in FIG. 7A, and the detected current value of the other motor changes as illustrated in FIG. 7B.

The determining units 4L and 4R compare the detected current values of the motors 8L and 8R at time t1 (t0<t1<t2), which has a predetermined time interval from the beginning of the current flowing to the motors 8L and 8R at time t0 in Step S24 of FIG. 6, and preset threshold values As (AL<As<Ah), for example. Next, as illustrated in FIG. 7A, when the detected current values of the motors 8L and 8R at time t1 are smaller than a threshold As, it is determined that the EPKBs 9L and 9R are in the release state. Next, as illustrated in FIG. 7B, when the detected current values of the motors 8L and 8R at time t1 are equal to or larger than the threshold As, it is determined that the EPKBs 9L and 9R are in the operation state.

Next, if a result of the determination by the determining units 4L and 4R indicates that the states of the EPKBs 9L and 9R on the left and right sides are not in agreement (not agreement in Step S25), the control unit 2 continuously controls the actuators 1L and 1R and switches the EPKBs 9L and 9R to the operation state (Step S29). Then, the control unit 2 maintains the state "operation" of the EPKBs 9L and 9R or updates the states stored in the storage unit 3 such that the states of the EPKBs 9L and 9R become "operation" (not illustrated). Maintaining the state "operation" means a case where the state stored in the storage unit 3 is currently "operation", and updating to the state "operation" means a case where the state stored in the storage unit 3 is currently "release."

On the other hand, when the result of the determination by the determining units 4L and 4R indicates that the states of the EPKBs 9L and 9R on left and right sides are in agreement (agreement in Step S25), the control unit 2 confirms whether the state at this time is "operation" or "release" (Step S26).

Next, when the states of the EPKBs 9L and 9R in the determination result are "operation" (operation in Step S26), the control unit 2 reads the states of the EPKBs 9L and 9R from the storage unit 3 (Step S27). At this time, if the states of the EPKBs 9L and 9R stored in the storage unit 3 are "operation" (operation in Step S28), the control unit 2 controls the actuators 1L and 1R so that the EPKBs 9L and 9R are consistently operated (Step S29).

Further, when the states of the EPKBs 9L and 9R stored in the storage unit 3 are "release" (release in Step S28), the control unit 2 controls the actuators 1L and 1R so that the EPKBs 9L and 9R switch to the release state (Step S30). That is, after the current flowing into the motors 8L and 8R along the current path indicated by the arrow in FIG. 3A is intercepted, the current is allowed to flow into the motors 8L and 8R along the current path indicated by the arrow in FIG. 3B in order to reverse the rotation of the motors 8L and 8R, thereby releasing the EPKBs 9L and 9R.

On the other hand, when the states of the EPKBs 9L and 9R in the determination result of the determining units 4L and 4R are "release" (release in Step S26), the control unit 2 reads the states of the EPKBs 9L and 9R from the storage unit 3 (Step S31). At this time, if the states of the EPKBs 9L and 9R stored in the storage unit 3 are "release" (release in Step S32), the control unit 2 controls the actuators 1L and 1R so that the EPKBs 9L and 9R are consistently released (Step S30).

Further, when the states of the EPKBs 9L and 9R stored in the storage unit 3 are "operation" (operation in Step S32), the control unit 2 controls the actuators 1L and 1R so that the EPKBs 9L and 9R switch to the operation state (Step S29).

Next, operation of the EPKB control device 10 during traveling of a car is described with reference to FIG. 8.

When the car travels, the vehicle speed is detected by the speed detecting unit 12 (Step S41), and the vehicle speed information indicating the vehicle speed is stored in the vehicle speed storage unit 6 (Step S42). Next, when the IG detecting unit 5 detects that the IG-SW 11 is switched to the OFF state once (YES in Step S43) and then to the ON state (YES in Step S44) by the driver's operation, the control unit 2 reads the vehicle speed information from the vehicle speed storage unit 6 (Step S45).

When the vehicle speed information stored in the vehicle speed storage unit 6 shows the vehicle speed=0 (YES in Step S46), the control unit 2 determines that the car is parked and executes Steps S22 to S32 of FIG. 6.

On the other hand, when the vehicle speed information stored in the vehicle speed storage unit 6 shows the vehicle speed≠0 (other than 0) (NO in Step S46), the control unit 2 determines that the car is traveling. In this case, the current is not sent to the motors 8L and 8R by the actuators 1L and 1R, and the states of the EPKBs 9L and 9R are not determined by the determining units 4L and 4R (Step S47).

According to the above embodiment, based on the current of the motors 8L and 8R which flows in a direction to which the EPKBs 9L and 9R are operated during the ON-state of the IG-SW 11, whether the EPKBs 9L and 9R are operated or released is determined (Steps S21 to S24 of FIG. 6). Next, when the determination result indicates that the EPKBs 9L and 9R stored in the storage unit 3 are in agreement, the EPKBs 9L and 9R are controlled in such a manner that the states are consistently in agreement (Steps S26, S28, and S29; Steps S26, S32, and S30). In addition, when the determination result indicates that the states of the EPKBs 9L and 9R stored in the storage unit 3 are not in agreement, the EPKBs 9L and 9R are controlled in such a manner that the states become the same as those stored in the storage unit 3 (Steps S26, S28, and S30; Steps S26, S32, and S29).

Therefore, when the mechanical system, such as the EPKBs 9L and 9R and the motors 8L and 8R is once removed from the car for repair, replacement, etc., and then remounted, the EPKBs 9L and the 9R operate as follows.

When both the brake state (brake state of the mechanical system) determined by the determining units 4L and 4R and the brake state (brake state of a control system) stored in the storage unit 3 are in agreement with each other as "operation", the EPKBs 9L and 9R are controlled in such a manner that the operation state is consistently maintained and operation under the brake states agreeing with each other is performed (operation in Step S26, operation in S28, and S29). On the other hand, when both of the brake state determined by the determining units 4L and 4R and the brake state stored in the storage unit 3 are in agreement with each other as "release", the EPKBs 9L and 9R are controlled in such a manner that the release state is continuously maintained and operation under the brake states agreeing with each other is performed (release in Step S26, release in S32, and S30). Accordingly, the EPKBs 9L and 9R can be operated in a state where the brake state of the mechanical system and the brake state of the control system are in agreement.

On the other hand, in the case where the brake states (brake states of the mechanical system) determined by the determining units 4L and 4R are "operation", and the brake states (brake states of the control system) stored in the storage unit 3 are "release", so that both are not in agreement; the EPKBs 9L and 9R are controlled in such a manner that the EPKBs 9L and 9R enter the release state (operation in Step S26, release in S28, and S30). For this reason, the brake state of the mechanical system changes from "operation" to "release, and thus comes to agree with the brake state of the control system. Furthermore, in the case where the brake states determined by the determining units 4L and 4R are "release" and the brake states stored in the storage unit 3 are "operation", so that both are not in agreement; the EPKBs 9L and 9R are controlled in such a manner that the EPKBs 9L and 9R enter the operation state (release in Step S26, operation in S32, and S29). For this reason, the brake state of the mechanical system changes from "release" to "operation, and comes to agree with the brake state of the control system. Accordingly, even in these cases, the EPKBs 9L and 9R can be operated in a state where the brake state of the mechanical system and the brake state of the control system are in agreement.

In addition, according to the above embodiment, whenever the control unit 2 controls the actuators 1L and 1R such that the EPKBs 9L and 9R are operated or released, the brake states of the EPKBs 9L and 9R stored in the storage unit 3 are updated (Step S5 of FIG. 4 and Step S15 of FIG. 5). Accordingly, the brake states of the EPKBs 9L and 9R moved by the control system can be correctly stored.

In addition, according to the above embodiment, since both of the EPKBs 9L and 9R enter the operation state if the brake states of the EPKBs 9L and 9R on the left and right sides were not in agreement with each other during the ON state of the IG-SW 11 (not agreement in Step S25 of FIG. 6, and Step S29), safety of the car can be secured.

Yet in addition, according to the above embodiment, even when the IG-SW 11 enters the OFF state once and after that will enter the ON state during traveling of a car, the current does not flow into the motors 8L and 8R, and the states of the EPKBs 9L and 9R cannot be determined (Step S47 of FIG. 8). Accordingly, it is possible to prevent the EPKBs 9L and 9R from abruptly switching to the operation state.

In addition to the embodiments described above, the present invention includes various other embodiments. For example, FIG. 6 discloses an example in which the EPKBs 9L and 9R are controlled such that the states of the EPKBs 9L and 9R come to agree with the brake states stored in the storage unit 3 when the states of the EPKBs 9L and 9R determined by the determining units 4L and 4R and 9R and the states of the EPKBs 9L and 9R stored in the storage unit 3 are not in agreement, respectively. However, the present invention is not limited only to the above. For example, in addition to the above, one or more embodiments of the present invention may be as illustrated in FIG. 9.

In FIG. 9, when the states of the EPKBs 9L and 9R in the determination result made by the determining units 4L and 4R are "operation" (operation in Step S26), and when the states of the EPKBs 9L and 9R stored in the storage unit 3 are "release" (release in Step S28), the control unit 2 controls the actuators 1L and 1R such that the EPKBs 9L and 9R enter the operation state (Step S33). Next, the states of the EPKBs 9L and 9R stored in the storage unit 3 are updated so that the states become "operation" (Step S34).

In addition, like the case of FIG. 6, when the states of the EPKBs 9L and 9R in the determination result made by the determining units 4L and 4R are "release" (release in Step S26), and when the states of the EPKBs 9L and 9R stored in the storage unit 3 are "operation" (operation in Step S32), the control unit 2 controls the actuators 1L and 1R such that the EPKBs 9L and 9R enter the operation state (Step S29). Step S35 of FIG. 9 is equivalent to Step S30 of FIG. 6.

That is, in FIG. 9, when the states (brake states of the mechanical system) of the EPKBs 9L and 9R determined by the determining units 4L and 4R and the states (brake states of the control system) of the EPKBs 9L and 9R stored in the storage unit 3 are not in agreement, respectively, the EPKBs 9L and 9R enter the operation state. Since the EPKBs 9L and 9R are made to enter the operation state through this operation even when the states of the EPKBs 9L and 9R differ between the mechanical system and the control system during the ON state of the IG-SW 11, it is possible to prevent accidental starting of the car and to ensure safety.

In addition, FIG. 8 discloses an example in which Steps S22 to S32 are executed when the IG-SW 11 enters the OFF state once and then switches to the ON state (YES in Step S44) and the vehicle speed is 0 (YES in Step S46). Instead of execution of Steps S22 to S32 of FIG. 6, Steps S22 to S35 of FIG. 9 may be executed.

Furthermore, although the above embodiments include an example in which one or more embodiments of the present invention is applied to the EPKBs 9L and 9R and to the EPKB control device 10 which brake front left and right wheels of a car, the present invention is not limited to this. One or more embodiments of the present invention can also be applied to an electric parking brake which brakes front wheels or rear wheels, and an electric parking brake control device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electric parking brake control device comprising:
   at least one actuator that drives at least one motor configured to operate or release at least one electric parking brake;
   a control unit that controls the at least one actuator;
   a storage unit that stores a state of the at least one parking brake;
   at least one determining unit that determines the state of the at least one parking brake based on current that flows into the at least one motor; and
   a detecting unit that detects an ON/OFF state of an ignition switch,
   wherein, when the detecting unit detects that the ignition switch is in the ON state, the at least one actuator sends current in a direction which causes the at least one parking brake to be operated to the at least one motor, and the at least one determining unit determines whether the at least one parking brake is in an operation state or a release state based on the current which flows to the at least one motor,
   wherein the control unit compares a state of the at least one parking brake determined by the at least one determining unit with a state of the at least one parking brake stored in the storage unit, and
   wherein, when the state of the at least one parking brake determined by the at least one determining unit and the state of the at least one parking brake stored in the storage unit are in agreement with each other, the control unit controls the at least one actuator such that the at least one parking brake maintains the states which are in agreement with each other.

2. The electric parking brake control device according to claim 1, wherein the control unit updates the state of the at least one parking brake stored in the storage unit whenever the at least one actuator is controlled such that the at least one parking brake is operated or released.

3. The electric parking brake control device according to claim 1, wherein the control unit controls the at least one actuator such that the state of the at least one parking brake becomes the state stored in the storage unit when the state of the at least one parking brake determined by the at least one determining unit and the state of the at least one parking brake stored in the storage unit are not in agreement.

4. The electric parking brake control device according to claim 1, wherein the control unit controls the at least one actuator such that the at least one parking brake enters the operation state when the state of the at least one parking brake determined by the at least one determining unit and the state of the at least one parking brake stored in the storage unit are not in agreement.

5. The electric parking brake control device according to claim 1,
   wherein the at least one parking brake includes a first parking brake for a left side and a second parking brake for a right side,
   wherein the at least one motor includes a first motor for the left side and a second motor for the right side,
   wherein the at least one actuator includes a first actuator for the left side and a second actuator for the right side,
   wherein the at least one determining unit determines whether the first and second parking brakes are operated or released, and
   wherein the control unit controls the first and second actuators such that the first and second parking brakes enter the operation state when the at least one determining unit determines that the states of the first and second parking brakes differ from each other.

6. The electric parking brake control device according to claim 1,
   wherein the control unit determines whether a vehicle is traveling based on vehicle speed information received from outside the control unit, and
   wherein, when the control unit determines that the vehicle is traveling, the current is not sent to the at least one motor by the at least one actuator and the state of the at least one parking brake is not determined by the determination, even when the detecting unit detects that the ignition switch is in an ON state.

* * * * *